(12) United States Patent
Tong et al.

(10) Patent No.: US 8,273,514 B2
(45) Date of Patent: Sep. 25, 2012

(54) INTERFACIAL LAYER AND COATING SOLUTION FOR FORMING THE SAME

(75) Inventors: Yuhua Tong, Webster, NY (US); Edward F. Grabowski, Webster, NY (US); Robert D. Bayley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 684 days.

(21) Appl. No.: 12/471,304

(22) Filed: May 22, 2009

(65) Prior Publication Data

US 2010/0297543 A1    Nov. 25, 2010

(51) Int. Cl.
G03G 5/14    (2006.01)

(52) U.S. Cl. .......................................................... 430/70
(58) Field of Classification Search ..................... 430/70
See application file for complete search history.

(56) References Cited

U.S. PATENT DOCUMENTS

| | | |
|---|---|---|
| 3,121,006 A | 2/1964 | Middleton et al. |
| 4,286,033 A | 8/1981 | Neyhart et al. |
| 4,291,110 A | 9/1981 | Lee |
| 4,338,387 A | 7/1982 | Hewitt |
| 4,387,980 A | 6/1983 | Ueno et al. |
| 4,464,450 A | 8/1984 | Teuscher |
| 4,587,189 A | 5/1986 | Hor et al. |
| 4,921,773 A | 5/1990 | Melnyk et al. |
| 5,069,993 A | 12/1991 | Robinette et al. |
| 5,110,700 A | 5/1992 | Teuscher et al. |
| 5,153,094 A | 10/1992 | Kazmaier et al. |
| 5,166,339 A | 11/1992 | Duff et al. |
| 5,189,155 A | 2/1993 | Mayo et al. |
| 5,189,156 A | 2/1993 | Mayo et al. |
| 5,215,839 A | 6/1993 | Yu |
| 5,660,961 A | 8/1997 | Yu |
| 5,756,245 A | 5/1998 | Esteghamatian et al. |
| 5,925,701 A | 7/1999 | Kung et al. |
| 5,958,638 A | 9/1999 | Katayama et al. |
| 7,295,797 B2 | 11/2007 | Osbourne |
| 2004/0202635 A1* | 10/2004 | Clausen et al. ............ 424/70.22 |
| 2006/0128591 A1* | 6/2006 | Albrecht et al. ............... 510/438 |
| 2006/0234147 A1 | 10/2006 | Wu et al. |

FOREIGN PATENT DOCUMENTS

| | | |
|---|---|---|
| EP | 0 789 051 A2 | 8/1997 |
| ER | 2 019 338 A1 | 1/2009 |

OTHER PUBLICATIONS

EP Application Serial No. 10162534.1 dated Sep. 23, 2010, 3 pages.

* cited by examiner

*Primary Examiner* — Hoa V Le
(74) *Attorney, Agent, or Firm* — Pillsbury Winthrop Shaw Pittman LLP

(57) ABSTRACT

The present embodiments are generally directed to an improved imaging member exhibiting various advantages over conventional imaging members. More specifically, the present embodiments are directed to an improved interfacial layer formed from an aqueous-based coating solution which exhibits improved formation and coating properties, such as increased homogeneity and adhesion, and methods for making the same. The aqueous-based coating solution is environment-friendly and avoids the need to use more expensive organic solvents which involve higher safety risks in the manufacturing process.

18 Claims, 1 Drawing Sheet

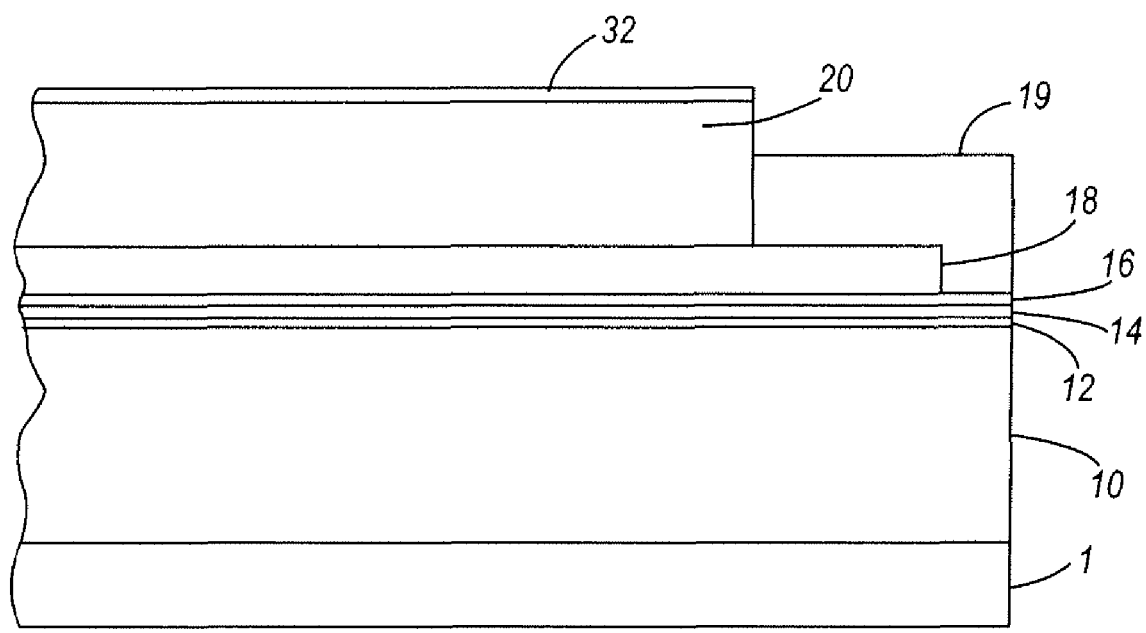

INTERFACIAL LAYER AND COATING SOLUTION FOR FORMING THE SAME

BACKGROUND

The presently disclosed embodiments relate generally to layers that are useful in imaging apparatus members and components, for use in electrostatographic, including digital, apparatuses. More particularly, the embodiments pertain to an electrostatographic imaging member having an improved interfacial layer formed from an aqueous-based coating solution which exhibits improved formation and coating properties, such as increased homogeneity and adhesion, and methods with environmentally friendly process for making the same.

In electrophotographic or electrostatographic printing, the charge retentive surface, typically known as a photoreceptor, is electrostatically charged, and then exposed to a light pattern of an original image to selectively discharge the surface in accordance therewith. The resulting pattern of charged and discharged areas on the photoreceptor form an electrostatic charge pattern, known as a latent image, conforming to the original image. The latent image is developed by contacting it with a finely divided electrostatically attractable powder known as toner. Toner is held on the image areas by the electrostatic charge on the photoreceptor surface. Thus, a toner image is produced in conformity with a light image of the original being reproduced or printed. The toner image may then be transferred to a substrate or support member (e.g., paper) directly or through the use of an intermediate transfer member, and the image affixed thereto to form a permanent record of the image to be reproduced or printed. Subsequent to development, excess toner left on the charge retentive surface is cleaned from the surface. The process is useful for light lens copying from an original or printing electronically generated or stored originals such as with a raster output scanner (ROS), where a charged surface may be imagewise discharged in a variety of ways.

The described electrostatographic copying process is well known and is commonly used for light lens copying of an original document. Analogous processes also exist in other electrostatographic printing applications such as, for example, digital laser printing or ionographic printing and reproduction where charge is deposited on a charge retentive surface in response to electronically generated or stored images.

To charge the surface of a photoreceptor, a contact type charging device has been used. The contact type charging device includes a conductive member which is supplied a voltage from a power source with a D.C. voltage superimposed with a A.C. voltage of no less than twice the level of the D.C. voltage. The charging device contacts the image bearing member (photoreceptor) surface, which is a member to be charged. The outer surface of the image bearing member is charged with the rubbing friction at the contact area. The contact type charging device charges the image bearing member to a predetermined potential. Typically the contact type charger is in the form of a roll charger such as that disclosed in U.S. Pat. No. 4,387,980, the relative portions thereof incorporated herein by reference. Other charging methods are further disclosed in U.S. Pat. No. 7,295,797, which is incorporated herein by reference.

Multilayered photoreceptors or imaging members have at least two layers, and may include a substrate, a conductive layer, an optional undercoat layer (sometimes referred to as a "charge blocking layer" or "hole blocking layer"), an optional adhesive layer, a photogenerating layer (sometimes referred to as a "charge generation layer," "charge generating layer," or "charge generator layer"), a charge transport layer, and an optional overcoating layer in either a flexible belt form or a rigid drum configuration. In the multilayer configuration, the active layers of the photoreceptor are the charge generation layer (CGL) and the charge transport layer (CTL). Enhancement of charge transport across these layers provides better photoreceptor performance. Multilayered flexible photoreceptor members may include an anti-curl layer on the backside of the substrate, opposite to the side of the electrically active layers, to render the desired photoreceptor flatness.

The multilayered photoreceptors may also include an interfacial layer. The role of interfacial layer (IFL) in an organic photoreceptor is to promote the adhesion between charge blocking layer and charge generation layer. The IFL is generally thinner than 800 Å. In belt photoreceptors, the material in IFL is a polyester resin which is also very soluble in solvents used in charge generation layer coating. Thus, the drying condition for charge generation layer coating will impact the function of IFL. For example, if the drying for the charge generation layer is too slow, the IFL could be dissolved into the charge generation layer and subsequently the photosensitive pigment in the charge generation layer could directly penetrate into the silane blocking layer or even into conductive substrate. This occurrence will cause two problems: (1) poor adhesion in photoreceptor device; (2) charge leaking during imaging process. One solution to such a problem is to coat a thick IFL. However, thicker IFLs usually lead to high residual voltage during photo-induced discharging. Thus, it is desirable to develop a thin but robust IFL which can provide high speed and high performance photoreceptors.

Conventional photoreceptors are disclosed in the following patents, a number of which describe the presence of light scattering particles in the undercoat layers: Yu, U.S. Pat. No. 5,660,961; Yu, U.S. Pat. No. 5,215,839; and Katayama et al., U.S. Pat. No. 5,958,638. The term "photoreceptor" or "photoconductor" is generally used interchangeably with the terms "imaging member." The term "electrostatographic" includes "electrophotographic" and "xerographic." The terms "charge transport molecule" are generally used interchangeably with the terms "hole transport molecule."

SUMMARY

According to aspects illustrated herein, there is provided a coating solution for forming an interfacial layer, comprising a charge control agent, a surfactant, and a solvent, wherein the coating solution is aqueous-based.

Another embodiment provides a process for forming an interfacial layer, comprising preparing a polyester aqueous emulsion by phase inversion emulsification, further comprising dissolving polyester resin in one or more organic solvents to form a organic solution, adding a basic solution such as ammonium hydroxide solution or sodium hydroxide solution to neutralize carboxylic acid groups in the polyester resin, and adding a water solution to form an emulsion, removing the one or more organic solvents from the polyester aqueous emulsion to form a second aqueous emulsion, combining the second aqueous emulsion with a surfactant and other optional additives such as a free radical initiator or a charge control agent to form a coating solution, and coating the coating solution on a substrate to form an interfacial layer.

Yet another embodiment, there is provided an imaging member comprising a substrate, a charge blocking layer disposed on the substrate, an interfacial layer disposed on the charge blocking layer, and a charge imaging layer, wherein the adhesive interfacial layer is disposed between the charge blocking layer and the charge imaging layer, and further wherein the interfacial layer is crosslinked and formed from an aqueous-based coating solution comprising a charge control agent, a surfactant, and optionally a solvent.

BRIEF DESCRIPTION OF THE DRAWINGS

For a better understanding, reference may be made to the accompanying FIGURE.

The FIGURE is a cross-sectional view of an imaging member in a belt configuration according to the present embodiments.

DETAILED DESCRIPTION

In the following description, reference is made to the accompanying drawings, which form a part hereof and which illustrate several embodiments. It is understood that other embodiments may be used and structural and operational changes may be made without departure from the scope of the present disclosure.

The present embodiments disclose an aqueous polyester coating solution that contains a surfactant and a charge control agent that, when coated and dried on a substrate, crosslinks to form a layer suitable to serve as an adhesion promoting interfacial layer in organic photoreceptors. The coating solution allows facilitates operated with no organic volatiles for the interfacial layer and provides a thin but robust and uniform interfacial layer. Moreover, testing of the electrical properties of the inventive photoreceptors demonstrated low discharge residual voltage, very stable cycling performance, low dark decay and low depletion. Thus, the present embodiments provide a low cost and environmentally-friendly process for charge blocking layers in organic photoreceptors.

In electrostatographic reproducing or digital printing apparatuses using a photoreceptor, a light image is recorded in the form of an electrostatic latent image upon a photosensitive member and the latent image is subsequently rendered visible by the application of a developer mixture. The developer, having toner particles contained therein, is brought into contact with the electrostatic latent image to develop the image on an electrostatographic imaging member which has a charge-retentive surface. The developed toner image can then be transferred to a copy substrate, such as paper, that receives the image via a transfer member.

The exemplary embodiments of this disclosure are described below with reference to the drawings. The specific terms are used in the following description for clarity, selected for illustration in the drawings and not to define or limit the scope of the disclosure. The same reference numerals are used to identify the same structure in different FIGURES unless specified otherwise. The structures in the FIGURES are not drawn according to their relative proportions and the drawings should not be interpreted as limiting the disclosure in size, relative size, or location. In addition, though the discussion will address negatively charged systems, the imaging members of the present disclosure may also be used in positively charged systems.

The FIGURE shows an imaging member having a belt configuration according to the embodiments. As shown, the belt configuration is provided with an anti-curl back coating 1, a supporting substrate 10, an electrically conductive ground plane 12, an undercoat layer 14, an adhesive layer 16, a charge generation layer 18, and a charge transport layer 20. An optional overcoat layer 32 and ground strip 19 may also be included. An exemplary photoreceptor having a belt configuration is disclosed in U.S. Pat. No. 5,069,993, which is hereby incorporated by reference.

The Overcoat Layer

Other layers of the imaging member may include, for example, an optional over coat layer 32. An optional overcoat layer 32, if desired, may be disposed over the charge transport layer 20 to provide imaging member surface protection as well as improve resistance to abrasion. In embodiments, the overcoat layer 32 may have a thickness ranging from about 0.1 micrometer to about 10 micrometers or from about 1 micrometer to about 10 micrometers, or in a specific embodiment, about 3 micrometers. These overcoating layers may include thermoplastic organic polymers or inorganic polymers that are electrically insulating or slightly semi-conductive. For example, overcoat layers may be fabricated from a dispersion including a particulate additive in a resin. Suitable particulate additives for overcoat layers include metal oxides including aluminum oxide, non-metal oxides including silica or low surface energy polytetrafluoroethylene (PTFE), and combinations thereof. Suitable resins include those described above as suitable for photogenerating layers and/or charge transport layers, for example, polyvinyl acetates, polyvinylbutyrals, polyvinylchlorides, vinylchloride and vinyl acetate copolymers, carboxyl-modified vinyl chloride/vinyl acetate copolymers, hydroxyl-modified vinyl chloride/vinyl acetate copolymers, carboxyl- and hydroxyl-modified vinyl chloride/vinyl acetate copolymers, polyvinyl alcohols, polycarbonates, polyesters, polyurethanes, polystyrenes, polybutadienes, polysulfones, polyarylethers, polyarylsulfones, polyethersulfones, polyethylenes, polypropylenes, polymethylpentenes, polyphenylene sulfides, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, poly-N-vinylpyrrolidinones, acrylate copolymers, alkyd resins, cellulosic film formers, poly (amideimide), styrene-butadiene copolymers, vinylidenechloride-vinylchloride copolymers, vinylacetate-vinylidenechloride copolymers, styrene-alkyd resins, polyvinylcarbazoles, and combinations thereof. Overcoating layers may be continuous and have a thickness of at least about 0.5 micrometer, or no more than 10 micrometers, and in further embodiments have a thickness of at least about 2 micrometers, or no more than 6 micrometers.

The Substrate

The photoreceptor support substrate 10 may be opaque or substantially transparent, and may comprise any suitable organic or inorganic material having the requisite mechanical properties. The entire substrate can comprise the same material as that in the electrically conductive surface, or the electrically conductive surface can be merely a coating on the substrate. Any suitable electrically conductive material can be employed, such as for example, metal or metal alloy. Electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafnium, titanium, niobium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. It could be single metallic compound or dual layers of different metals and/or oxides.

The substrate 10 can also be formulated entirely of an electrically conductive material, or it can be an insulating material including inorganic or organic polymeric materials, such as MYLAR, a commercially available biaxially oriented polyethylene terephthalate from DuPont, or polyethylene naphthalate available as KALEDEX 2000. The substrate may have a ground plane layer 12 comprising a conductive titanium or titanium/zirconium coating. Alternatively, the substrate may have a layer of an organic or inorganic material having a semiconductive surface layer, such as indium tin oxide, aluminum, titanium, and the like, or having a conductive surface layer being made exclusively of a conductive material such as, aluminum, chromium, nickel, brass, other metals and the like. The thickness of the support substrate depends on numerous factors, including mechanical performance and economic considerations.

The substrate 10 may have a number of many different configurations, such as for example, a plate, a cylinder, a drum, a scroll, an endless flexible belt, and the like. In the case of the substrate being in the form of a belt, as shown in the FIGURE, the belt can be seamed or seamless. In embodiments, the photoreceptor herein is in a drum configuration.

The thickness of the substrate 10 depends on numerous factors, including flexibility, mechanical performance, and economic considerations. The thickness of the support substrate 10 of the present embodiments may be at least about 500 micrometers, or no more than about 3,000 micrometers, or be at least about 750 micrometers, or no more than about 2500 micrometers.

An exemplary substrate support 10 is not soluble in any of the solvents used in each coating layer solution, is optically transparent or semi-transparent, and is thermally stable up to a high temperature of about 150° C. A substrate support 10 used for imaging member fabrication may have a thermal contraction coefficient ranging from about $1 \times 10^{-5}$ per ° C. to about $3 \times 10^{-5}$ per ° C. and a Young's Modulus of between about $5 \times 10^{-5}$ psi ($3.5 \times 10^{-4}$ Kg/cm$^2$) and about $7 \times 10^{-5}$ psi ($4.9 \times 10^{-4}$ Kg/cm$^2$).

The Hole Blocking Layer

After deposition of the electrically conductive ground plane layer, the hole blocking layer 14 may be applied thereto. Electron blocking layers for positively charged photoreceptors allow holes from the imaging surface of the photoreceptor to migrate toward the conductive layer. For negatively charged photoreceptors, any suitable hole blocking layer capable of forming a barrier to prevent hole injection from the conductive layer to the opposite photoconductive layer may be utilized. The hole blocking layer may include polymers such as polyvinylbutyral, epoxy resins, polyesters, polysiloxanes, polyamides, polyurethanes and the like, or may be nitrogen containing siloxanes or nitrogen containing titanium compounds such as trimethoxysilyl propylene diamine, hydrolyzed trimethoxysilyl propyl ethylene diamine, N-beta-(aminoethyl) gamma-amino-propyl trimethoxy silane, isopropyl 4-aminobenzene sulfonyl, di(dodecylbenzene sulfonyl)titanate, isopropyl di(4-aminobenzoyl)isostearoyl titanate, isopropyl tri(N-ethylamino-ethylamino)titanate, isopropyl trianthranil titanate, isopropyl tri(N,N-dimethylethylamino)titanate, titanium-4-amino benzene sulfonate oxyacetate, titanium 4-aminobenzoate isostearate oxyacetate, [H$_2$N(CH$_2$)$_4$]CH$_3$Si(OCH$_3$)$_2$, (gamma-aminobutyl) methyl diethoxysilane, and [H$_2$N(CH$_2$)$_3$]CH$_3$Si(OCH$_3$)$_2$ (gamma-aminopropyl)methyl diethoxysilane, as disclosed in U.S. Pat. Nos. 4,338,387, 4,286,033 and 4,291,110.

General embodiments of the undercoat layer may comprise a metal oxide and a resin binder. The metal oxides that can be used with the embodiments herein include, but are not limited to, titanium oxide, zinc oxide, tin oxide, aluminum oxide, silicon oxide, zirconium oxide, indium oxide, molybdenum oxide, and mixtures thereof. Undercoat layer binder materials may include, for example, polyesters, MOR-ESTER 49,000 from Morton International Inc., VITEL PE-100, VITEL PE-200, VITEL PE-200D, and VITEL PE-222 from Goodyear Tire and Rubber Co., polyarylates such as ARDEL from AMOCO Production Products, polysulfone from AMOCO Production Products, polyurethanes, and the like.

The hole blocking layer should be continuous and have a thickness of less than about 0.5 micrometer because greater thicknesses may lead to undesirably high residual voltage. A hole blocking layer of between about 0.005 micrometer and about 1 micrometer is used because charge neutralization after the exposure step is facilitated and optimum electrical performance is achieved. A thickness of between about 0.03 micrometer and about 0.06 micrometer is used for hole blocking layers for optimum electrical behavior. The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layer is applied in the form of a dilute solution, with the solvent being removed after deposition of the coating by conventional techniques such as by vacuum, heating and the like. Generally, a weight ratio of hole blocking layer material and solvent of between about 0.05:100 to about 0.5:100 is satisfactory for spray coating.

The Charge Generation Layer

The charge generation layer 18 may thereafter be applied to the undercoat layer 14. Any suitable charge generation binder including a charge generating/photoconductive material, which may be in the form of particles and dispersed in a film forming binder, such as an inactive resin, may be utilized. Examples of charge generating materials include, for example, inorganic photoconductive materials such as amorphous selenium, trigonal selenium, and selenium alloys selected from the group consisting of selenium-tellurium, selenium-tellurium-arsenic, selenium arsenide and mixtures thereof, and organic photoconductive materials including various phthalocyanine pigments such as the X-form of metal free phthalocyanine, metal phthalocyanines such as vanadyl phthalocyanine and copper phthalocyanine, hydroxy gallium phthalocyanines, chlorogallium phthalocyanines, titanyl phthalocyanines, quinacridones, dibromo anthanthrone pigments, benzimidazole perylene, substituted 2,4-diamino-triazines, polynuclear aromatic quinones, enzimidazole perylene, and the like, and mixtures thereof, dispersed in a film forming polymeric binder. Selenium, selenium alloy, benzimidazole perylene, and the like and mixtures thereof may be formed as a continuous, homogeneous charge generation layer. Benzimidazole perylene compositions are well known and described, for example, in U.S. Pat. No. 4,587,189, the entire disclosure thereof being incorporated herein by reference. Multi-charge generation layer compositions may be used where a photoconductive layer enhances or reduces the properties of the charge generation layer. Other suitable charge generating materials known in the art may also be utilized, if desired. The charge generating materials selected should be sensitive to activating radiation having a wavelength between about 400 and about 900 nm during the imagewise radiation exposure step in an electrophotographic imaging process to form an electrostatic latent image. For example, hydroxygallium phthalocyanine absorbs light of a wavelength of from about 370 to about 950 nanometers, as disclosed, for example, in U.S. Pat. No. 5,756,245.

A number of titanyl phthalocyanines, or oxytitanium phthalocyanines for the photoconductors illustrated herein are photogenerating pigments known to absorb near infrared light around 800 nanometers, and may exhibit improved sensitivity compared to other pigments, such as, for example, hydroxygallium phthalocyanine. Generally, titanyl phthalocyanine is known to have five main crystal forms known as Types I, II, III, X, and IV. For example, U.S. Pat. Nos. 5,189,155 and 5,189,156, the disclosures of which are totally incorporated herein by reference, disclose a number of methods for obtaining various polymorphs of titanyl phthalocyanine. Additionally, U.S. Pat. Nos. 5,189,155 and 5,189,156 are directed to processes for obtaining Types I, X, and IV phthalocyanines. U.S. Pat. No. 5,153,094, the disclosure of which is totally incorporated herein by reference, relates to the preparation of titanyl phthalocyanine polymorphs including Types I, II, III, and IV polymorphs. U.S. Pat. No. 5,166,339, the disclosure of which is totally incorporated herein by reference, discloses processes for preparing Types I, IV, and X titanyl phthalocyanine polymorphs, as well as the preparation of two polymorphs designated as Type Z-1 and Type Z-2.

Any suitable inactive resin materials may be employed as a binder in the charge generation layer 18, including those described, for example, in U.S. Pat. No. 3,121,006, the entire disclosure thereof being incorporated herein by reference. Organic resinous binders include thermoplastic and thermosetting resins such as one or more of polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl butyral, polyvinyl acetate, polysiloxanes, polyacrylates, polyvinyl acetals, polyamides, polyimides, amino resins, phenylene oxide resins, terephthalic acid resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride/vinylchloride copolymers, vinylacetate/vinylidene chloride copolymers, styrene-alkyd resins, and the like. Another film-forming polymer binder is PCZ-400 (poly (4,4'-dihydroxy-diphenyl-1-1-cyclohexane) which has a viscosity-average molecular weight of 40,000 and is available from Mitsubishi Gas Chemical Corporation (Tokyo, Japan).

The charge generating material can be present in the resinous binder composition in various amounts. Generally, at least about 5 percent by volume, or no more than about 90 percent by volume of the charge generating material is dispersed in at least about 95 percent by volume, or no more than about 10 percent by volume of the resinous binder, and more specifically at least about 20 percent, or no more than about 60 percent by volume of the charge generating material is dispersed in at least about 80 percent by volume, or no more than about 40 percent by volume of the resinous binder composition.

In specific embodiments, the charge generation layer 18 may have a thickness of at least about 0.01 μm, or no more than about 2 μm, or of at least about 0.2 μm, or no more than about 1 μm. These embodiments may be comprised of chlorogallium phthalocyanine or hydroxygallium phthalocyanine or mixtures thereof. The charge generation layer 18 containing the charge generating material and the resinous binder material generally ranges in thickness of at least about 0.01 μm, or no more than about 5 μm, for example, from about 0.2 μm to about 3 μm when dry. The charge generation layer thickness is generally related to binder content. Higher binder content compositions generally employ thicker layers for charge generation.

The Charge Transport Layer

In a drum photoreceptor, the charge transport layer comprises a single layer of the same composition. As such, the charge transport layer will be discussed specifically in terms of a single layer 20, but the details will be also applicable to an embodiment having dual charge transport layers. The charge transport layer 20 is thereafter applied over the charge generation layer 18 and may include any suitable transparent organic polymer or non-polymeric material capable of supporting the injection of photogenerated holes or electrons from the charge generation layer 18 and capable of allowing the transport of these holes/electrons through the charge transport layer to selectively discharge the surface charge on the imaging member surface. In one embodiment, the charge transport layer 20 not only serves to transport holes, but also protects the charge generation layer 18 from abrasion or chemical attack and may therefore extend the service life of the imaging member. The charge transport layer 20 can be a substantially non-photoconductive material, but one which supports the injection of photogenerated holes from the charge generation layer 18.

The layer 20 is normally transparent in a wavelength region in which the electrophotographic imaging member is to be used when exposure is affected there to ensure that most of the incident radiation is utilized by the underlying charge generation layer 18. The charge transport layer should exhibit excellent optical transparency with negligible light absorption and no charge generation or charge trapping when exposed to a wavelength of light useful in xerography, e.g., 400 to 900 nanometers. In the case when the photoreceptor is prepared with the use of a transparent substrate 10 and also a transparent or partially transparent conductive layer 12, image wise exposure or erase may be accomplished through the substrate 10 with all light passing through the back side of the substrate. In this case, the materials of the layer 20 need not transmit light in the wavelength region of use if the charge generation layer 18 is sandwiched between the substrate and the charge transport layer 20. The charge transport layer 20 in conjunction with the charge generation layer 18 is an insulator to the extent that an electrostatic charge placed on the charge transport layer is not conducted in the absence of illumination. The charge transport layer 20 should trap minimal charges as the charge passes through it during the discharging process.

The charge transport layer 20 may include any suitable charge transport component or activating compound useful as an additive dissolved or molecularly dispersed in an electrically inactive polymeric material, such as a polycarbonate binder, to form a solid solution and thereby making this material electrically active. "Dissolved" refers, for example, to forming a solution in which the small molecule is dissolved in the polymer to form a homogeneous phase; and molecularly dispersed in embodiments refers, for example, to charge transporting molecules dispersed in the polymer, the small molecules being dispersed in the polymer on a molecular scale. The charge transport component may be added to a film forming polymeric material which is otherwise incapable of supporting the injection of photogenerated holes from the charge generation material and incapable of allowing the transport of these holes through. This addition converts the electrically inactive polymeric material to a material capable of supporting the injection of photogenerated holes from the charge generation layer 18 and capable of allowing the transport of these holes through the charge transport layer 20 in order to discharge the surface charge on the charge transport layer. The high mobility charge transport component may comprise small molecules of an organic compound which cooperate to transport charge between molecules and ultimately to the surface of the charge transport layer. For example, but not limited to, N,N'-diphenyl-N,N-bis(3-methyl phenyl)-1,1'-biphenyl-4,4'-diamine (TPD), other arylamines like triphenyl amine, N,N,N',N'-tetra-p-tolyl-1,1'-biphenyl-4,4'-diamine (TM-TPD), and the like.

A number of charge transport compounds can be included in the charge transport layer, which layer generally is of a thickness of from about 5 to about 75 micrometers, and more specifically, of a thickness of from about 15 to about 40 micrometers. Examples of charge transport components are aryl amines of the following formulas/structures:

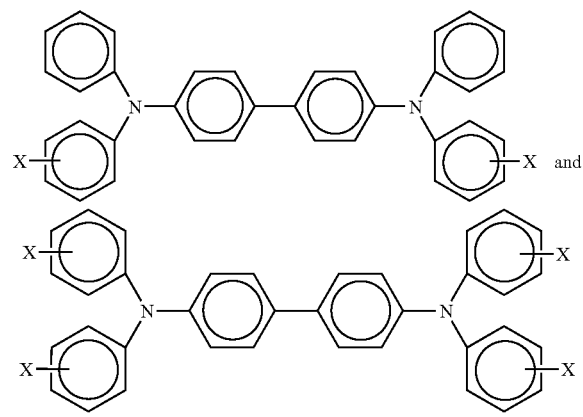

wherein X is a suitable hydrocarbon like alkyl, alkoxy, aryl, and derivatives thereof; a halogen, or mixtures thereof, and especially those substituents selected from the group consisting of Cl and $CH_3$; and molecules of the following formulas

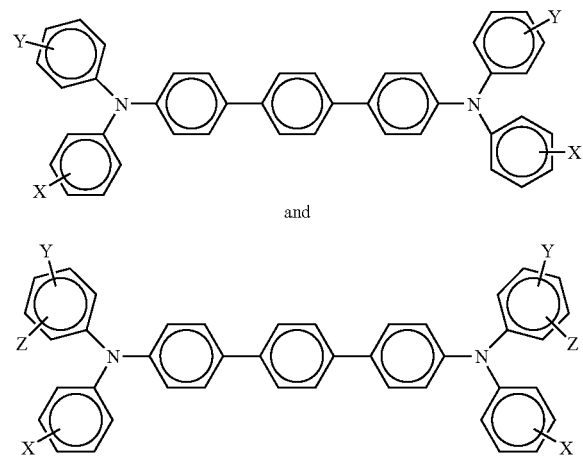

wherein X, Y and Z are independently alkyl, alkoxy, aryl, a halogen, or mixtures thereof, and wherein at least one of Y and Z are present.

Alkyl and alkoxy contain, for example, from 1 to about 25 carbon atoms, and more specifically, from 1 to about 12 carbon atoms, such as methyl, ethyl, propyl, butyl, pentyl, and the corresponding alkoxides. Aryl can contain from 6 to about 36 carbon atoms, such as phenyl, and the like. Halogen includes chloride, bromide, iodide, and fluoride. Substituted alkyls, alkoxys, and aryls can also be selected in embodiments.

Examples of specific aryl amines that can be selected for the charge transport layer include N,N'-diphenyl-N,N'-bis (alkylphenyl)-1,1-biphenyl-4,4'-diamine wherein alkyl is selected from the group consisting of methyl, ethyl, propyl, butyl, hexyl, and the like; N,N'-diphenyl-N,N'-bis(halophenyl)-1,1'-biphenyl-4,4'-diamine wherein the halo substituent is a chloro substituent; N,N'-bis(4-butylphenyl)-N,N'-di-p-tolyl-[p-terphenyl]-4,4"-diamine, N,N'-bis(4-butylphenyl)-N,N'-di-m-tolyl-[p-terphenyl]-4,4"-diamine, N,N'-bis(4-butylphenyl)-N,N"-di-o-tolyl-[p-terphenyl]-4,4"-diamine, N,N"-bis(4-butylphenyl)-N,N'-bis-(4-isopropylphenyl)-[p-terphenyl]-4,4"-diamine, N,N'-bis(4-butylphenyl)-N,N'-bis-(2-ethyl-6-methylphenyl)-[p-terphenyl]-4,4"-diamine, N,N'-bis(4-butylphenyl)-N,N'-bis-(2,5-dimethylphenyl)-[p-terphenyl]-4,4'-diamine, N,N'-diphenyl-N,N'-bis(3-chlorophenyl)-[p-terphenyl]-4,4"-diamine, and the like. Other known charge transport layer molecules may be selected in embodiments, reference for example, U.S. Pat. Nos. 4,921,773 and 4,464,450, the disclosures of which are totally incorporated herein by reference.

Examples of the binder materials selected for the charge transport layers include components, such as those described in U.S. Pat. No. 3,121,006, the disclosure of which is totally incorporated herein by reference. Specific examples of polymer binder materials include polycarbonates, polyarylates, acrylate polymers, vinyl polymers, cellulose polymers, polyesters, polysiloxanes, polyamides, polyurethanes, poly(cyclo olefins), and epoxies, and random or alternating copolymers thereof. In embodiments, the charge transport layer, such as a hole transport layer, may have a thickness of at least about 10 µm, or no more than about 40 µm.

Examples of components or materials optionally incorporated into the charge transport layers or at least one charge transport layer to, for example, enable improved lateral charge migration (LCM) resistance include hindered phenolic antioxidants such as tetrakis methylene(3,5-di-tert-butyl-4-hydroxy hydrocinnamate)methane (IRGANOX® 1010, available from Ciba Specialty Chemical), butylated hydroxytoluene (BHT), and other hindered phenolic antioxidants including SUMILIZER™ BHT-R, MDP-S, BBM-S, WX-R, NW, BP-76, BP-101, GA-80, GM and GS (available from Sumitomo Chemical Co., Ltd.), IRGANOX® 1035, 1076, 1098, 1135, 1141, 1222, 1330, 1425WL, 1520L, 245, 259, 3114, 3790, 5057 and 565 (available from Ciba Specialties Chemicals), and ADEKA STAB™ AO-20, AO-30, AO-40, AO-50, AO-60, AO-70, AO-80 and AO-330 (available from Asahi Denka Co., Ltd.); hindered amine antioxidants such as SANOL™ LS-2626, LS-765, LS-770 and LS-744 (available from SANKYO CO., Ltd.), TINUVIN® 144 and 622LD (available from Ciba Specialties Chemicals), MARK™ LA57, LA67, LA62, LA68 and LA63 (available from Asahi Denka Co., Ltd.), and SUMILIZER® TPS (available from Sumitomo Chemical Co., Ltd.); thioether antioxidants such as SUMILIZER® TP-D (available from Sumitomo Chemical Co., Ltd); phosphite antioxidants such as MARK™ 2112, PEP-8, PEP-24G, PEP-36, 329K and HP-10 (available from Asahi Denka Co., Ltd.); other molecules such as bis(4-diethylamino-2-methylphenyl)phenylmethane (BDETPM), bis-[2-methyl-4-(N-2-hydroxyethyl-N-ethylaminophenyl)]-phenylmethane (DHTPM), and the like. The weight percent of the antioxidant in at least one of the charge transport layer is from about 0 to about 20, from about 1 to about 10, or from about 3 to about 8 weight percent.

The charge transport layer should be an insulator to the extent that the electrostatic charge placed on the hole transport layer is not conducted in the absence of illumination at a rate sufficient to prevent formation and retention of an electrostatic latent image thereon. The charge transport layer is substantially nonabsorbing to visible light or radiation in the region of intended use, but is electrically "active" in that it allows the injection of photogenerated holes from the photoconductive layer, that is the charge generation layer, and allows these holes to be transported through itself to selectively discharge a surface charge on the surface of the active layer.

Any suitable and conventional technique may be utilized to form and thereafter apply the charge transport layer mixture to the supporting substrate layer. The charge transport layer may be formed in a single coating step or in multiple coating steps. Dip coating, ring coating, spray, gravure or any other drum coating methods may be used.

Drying of the deposited coating may be effected by any suitable conventional technique such as oven drying, infra red radiation drying, air drying and the like. The thickness of the charge transport layer after drying is from about 10 μm to about 40 μm or from about 12 μm to about 36 μm for optimum photoelectrical and mechanical results. In another embodiment the thickness is from about 14 μm to about 36 μm.

The Adhesive Interfacial Layer

An optional separate adhesive interfacial layer may be provided in certain configurations, such as for example, in flexible web configurations. In the embodiment illustrated in the FIGURE, the interfacial layer would be situated between the blocking layer 14 and the charge generation layer 18. The interfacial layer may include a copolyester resin. Exemplary polyester resins which may be utilized for the interfacial layer include polyarylatepolyvinylbutyrals, such as ARDEL POLYARYLATE (U-100) commercially available from Toyota Hsutsu Inc., VITEL PE-100, VITEL PE-200, VITEL PE-200D, and VITEL PE-222, all from Bostik, 49,000 polyester from Rohm Hass, polyvinyl butyral, and the like. The adhesive interfacial layer may be applied directly to the hole blocking layer 14. Thus, the adhesive interfacial layer in embodiments is in direct contiguous contact with both the underlying hole blocking layer 14 and the overlying charge generator layer 18 to enhance adhesion bonding to provide linkage. In yet other embodiments, the adhesive interfacial layer is entirely omitted.

Any suitable solvent or solvent mixtures may be employed to form a coating solution of the polyester for the adhesive interfacial layer. Solvents may include tetrahydrofuran, toluene, monochlorobenzene, methylene chloride, cyclohexanone, and the like, and mixtures thereof. Any other suitable and conventional technique may be used to mix and thereafter apply the adhesive layer coating mixture to the hole blocking layer. Application techniques may include spraying, dip coating, roll coating, wire wound rod coating, and the like. Drying of the deposited wet coating may be effected by any suitable conventional process, such as oven drying, infra red radiation drying, air drying, and the like.

The adhesive interfacial layer may have a thickness of at least about 0.01 micrometers, or no more than about 5 micrometers after drying. In embodiments, the dried thickness is from about 0.03 micrometers to about 1 micrometer.

In present embodiments, the interfacial layer is cross-linked and formed from a polyester aqueous coating solution prepared through a phase inversion process. The interfacial layers formed from the coating solution exhibit numerous advantages over interfacial layers formed from conventional coating solutions. In the chemical structure of the polyester resin for IFL, there are unsaturated C=C double bonds in the repeat units. The C=C double bonds in the polyester resin can be polymerized by a free radical initiator, such as for example, benzoyl peroxide, or UV radiation. By heat drying of the coating, cross-linking is promoted and forms an interfacial layer that will not dissolve into the charge generation layer during formation of the respective layers.

In the coating solution, other elements may be incorporated to further improve the coating quality. For example, a surfactant may be included to improve coating uniformity. In particular embodiments, the addition of about 3% of a charge control agent, such as zinc salicylate, improves electrical properties of the subsequently formed photoreceptor. Zinc salicylate has the chemical structure shown below:

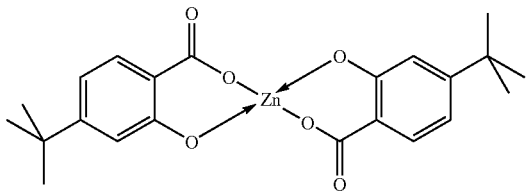

When the hand-fabricated device was tested in the Xerox-4000 scanner, resultant electrical properties were very good after 10,000 cycles. The IFL was also stored at high relative humidity and peel tested for adhesion. It was discovered that relative humidity had no effect upon adhesion.

In one embodiment, the coating solution for forming an interfacial lay comprises a polyester resin, a charge control agent, a surfactant, and a solvent, wherein the coating solution is aqueous-based. The polyester resin may be prepared by the reaction of dicarboxylic acids and diols. the acids can be selected from fumaric acid, malonic acid, itaconic acid, 2-methylitaconic acid, maleic acid, maleic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, or there is selected dialkyl esters wherein alkyl contains from about 2 to about 22 carbon atoms, and are esters of malonate, succinate, fumarate, itaconate, terephthalate, isophthalate, phthalate, cyclohexanedioate, mixtures thereof, and which diacids are optionally selected in an amount of from about 0.95 mole equivalent to about 1.1 mole equivalents, based on about 1 mole equivalent of organic diol utilized.

The diols can be selected from 1,2-propanediol, 1,3-propanediol, 1,3-butanediol, pentylene glycol, hexylene glycol, diphenol, neopentyl glycol, diethylene glycol, dipropylene glycol, 2,2-bis-(4-hydroxy phenyl)propane, 2,2-bis-(3-hydroxy phenyl)propane, 2,2-bis-(2-hydroxy phenyl)propane, 2,2-bis-(5-hydroxy phenyl)propane, bisphenol A, ethoxylated bisphenol A, bis-(4-hydroxy phenyl) methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, which diol is optionally selected in an amount of from about 0.90 mole equivalents to about 1.1 mole equivalents, based on about 1 mole equivalent of dicarboxylic acid utilized. The polyester resin may be present in the coating solution in an amount of from about 0.05 percent to about 50 percent by weight of the total weight of the coating solution. In specific embodiments, the polyester resin used for the IFL is a copolymer of terephthalic acid, dodecenylsuccinic anhydride, trimellitic acid, fumaric acid, Bisphenol A ethylenoxide adducts, and Bisphenol A propylenoxide adducts. The weight average molecular weight ($M_w$) of this polyester resin is about 45,000, the glass transition temperature of this polyester resin is about 56° C., and the acid value of this polyester resin is about 15 mgKOH/g. In further embodiments, the polyester resin has a weight average molecular weight (Mw) from about 5000 to about 100,000, a glass transition temperature of from about 0 to about 100° C., and an acid value of from about 1 to about 50 mgKOH/g. In embodiments, the charge control agent is selected from the group consisting of zinc salicylate; calcium salicylate, aluminum salicylate, chromium salicylate, boron salicylate, zirconium salicylate, iron salicylate, and the like and mixtures thereof. The charge control agent may be present in the coating solution in an amount of from about 0.005 percent to about 20 percent by weight of the total weight of the coating solution.

In some embodiments, the surfactant is an anionic surfactant. In other embodiments, the surfactant may be selected from the group consisting of sodium dodecylbenzenesulfonate, sodium dodecylsulfate, sodium dodecyinaphthalene sulfate, dialkyl benzenealkyl, sulfates, sulfonates, adipic acid, hexa decyldiphenyloxide disulfonate, and mixtures thereof. The surfactant may be present in the coating solution in an amount of from about 0.0001 percent to about 10 percent by weight of the total weight of the coating solution.

The solvent may be selected from the group consisting of deionized water, methanol, methyl ethyl ketone, ethanol, propanol, tetrahydrofuran, acetone, dimethylformamide, N-methylpyrrolidinone, and mixtures thereof. In embodiments, the solvent is present in the coating solution in an amount of from about 10 percent to about 99.9 percent by weight of the total weight of the coating solution.

The Anti-Curl Back Coating Layer

The anti-curl back coating 1 may comprise organic polymers or inorganic polymers that are electrically insulating or slightly semi-conductive. The anti-curl back coating provides flatness and/or abrasion resistance.

Anti-curl back coating 1 may be formed at the back side of the substrate 2, opposite to the imaging layers. The anti-curl back coating may comprise a film forming resin binder and an adhesion promoter additive. The resin binder may be the same resins as the resin binders of the charge transport layer discussed above. Examples of film forming resins include polyacrylate, polystyrene, bisphenol-based polycarbonate, poly(4,4'-isopropylidene diphenyl carbonate), 4,4'-cyclohexylidene diphenyl polycarbonate, and the like. Adhesion promoters used as additives include 49,000 (du Pont), Vitel PE-100, Vitel PE-200, Vitel PE-307 (Goodyear), and the like. Usually from about 1 to about 15 weight percent adhesion promoter is selected for film forming resin addition. The thickness of the anti-curl back coating is at least about 3 micrometers, or no more than about 35 micrometers, or about 14 micrometers.

In addition, in the present embodiments using a belt configuration, the charge transport layer may consist of a single pass charge transport layer or a dual pass charge transport layer (or dual layer charge transport layer) with the same or different transport molecule ratios. In these embodiments, the dual layer charge transport layer has a total thickness of from about 10 μm to about 40 μm. In other embodiments, each layer of the dual layer charge transport layer may have an individual thickness of from 2 μm to about 20 μm. Moreover, the charge transport layer may be configured such that it is used as a top layer of the photoreceptor to inhibit crystallization at the interface of the charge transport layer and the overcoat layer. In another embodiment, the charge transport layer may be configured such that it is used as a first pass charge transport layer to inhibit microcrystallization occurring at the interface between the first pass and second pass layers.

Various exemplary embodiments encompassed herein include a method of imaging which includes generating an electrostatic latent image on an imaging member, developing a latent image, and transferring the developed electrostatic image to a suitable substrate.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The example set forth herein below and is illustrative of different compositions and conditions that can be used in practicing the present embodiments. All proportions are by weight unless otherwise indicated. It will be apparent, however, that the embodiments can be practiced with many types of compositions and can have many different uses in accordance with the disclosure above and as pointed out hereinafter.

Example 1

Polyester Aqueous Solution Preparation

Polyester resin 77.0 Kilograms (kg), isopropanol 6.9 kg, and methyl ethyl ketone 38.5 kg were mixed at 40° C. for about 2 hours to get a clear polymer solution. With vigorous stirring, 10 wt % $NH_4OH$ (2.57 kg) was added slowly. About 10 minutes after the addition, 231 kg of de-ionized water was added in 2 hours. After the addition of water, the milky mixture was distilled under reduced pressure (38 KPa absolute pressure) to remove organic solvents. The final polyester aqueous emulsion contained less than 50 ppm organic volatiles, with solid content about 29 wt. % and medium particle size $D_{50}$ by volume about 187 nm.

Preparation of IFL Coating Solutions:

For Sample ID #1, the cross-linked IFL, free radical initiator benzoyl peroxide 0.035 g and zinc salicylate 0.013 g were dissolved in 3 g of mehyl ethyl ketone. This solution was then added into a mixture of 54.2 g of de-ionized water, 1.5 g of the above polyester emulsion and surfactant sodium deodecylbenzene sulfonate 0.003 g. After mixed for 30 minutes, the aqueous emulsion is ready for coating.

For Sample ID#2, the non cross-linkable IFL, the same procedure in Sample ID#1 was used. However, in the formulation, no initiator (benzoyl peroxide) and no charge control agent (zinc salicylate) were added to the solution.

IFL Coating and Drying

The polyester aqueous solution prepared above was coated on a titanium/zirconium metallized polyester substrate with silane charge blocking layer on the top, using a 0.0005-mil bar. After being dried in an air-flowing hood, the coated substrate was dried in a 120° C. oven for 1 minute.

Fabrication of Full Photoreceptor Devices

On the above prepared substrate with the inventive IFL layer, charge generation layer and charge transport layer were formed by hand-coating, using conventional solutions for the respective layers, as described in U.S. Pat. No. 7,344,809. The full devices incorporated Sample ID#1 and Sample ID#2 from the above IFL coating process.

Electrical Property Testing

The full photoreceptor devices were tested by a XEROX 4000 scanner. The electrical properties of the samples are shown in Table 1. This table contains the electrical properties of the photoreceptor devices after 10,000 cycling test. $V_0$ is the applied voltage at time zero, $V_{cyc\text{-}up}$ is the erase voltage change after 10,000 cycling test. Although the samples were hand-coated, the devices still exhibited very good electrical properties, such as low cycle-up voltage [$V_{cyc\text{-}up}$] and low dark decay voltage [$V_{dd}$].

TABLE 1

| Sample ID | $V_0$ | $V_{dd}$ | $V_{\text{-}cyc\text{-}up}$ |
|---|---|---|---|
| #1 Cross-linked IFL | 800 | 24.6 | −8.4 |
| #2 | 800 | 23.0 | 31.2 |

All the patents and applications referred to herein are hereby specifically, and totally incorporated herein by reference in their entirety in the instant specification.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A coating solution, comprising:
   a charge control agent;
   a surfactant; and
   a solvent, wherein the coating solution is aqueous-based and crosslinks to form an interfacial layer for an imaging member.

2. The coating solution of claim 1 further comprising a polyester resin.

3. The coating solution of claim 2, wherein the polyester resin is prepared by a reaction of dicarboxylic acids and diols.

4. The coating solution of claim 2, wherein the polyester resin is present in the coating solution in an amount of from about 0.05 percent to about 50 percent by weight of the total weight of the coating solution.

5. The coating solution of claim 2, wherein the polyester resin has a weight average molecular weight (Mw) from about 5000 to about 100,000.

6. The coating solution of claim 2, wherein the polyester resin has a glass transition temperature of from about 0 to about 100° C.

7. The coating solution of claim 1, wherein the polyester resin has an acid value of from about 1 to about 50 mgKOH/g.

8. The coating solution of claim 1, wherein the charge control agent is present in the coating solution in an amount of from about 0.005 percent to about 20 percent by weight of the total weight of the coating solution.

9. The coating solution of claim 1, wherein the surfactant is an anionic surfactant.

10. The coating solution of claim 1, wherein the surfactant is selected from the group consisting of sodium dodecylbenzenesulfonate, sodium dodecylsulfate, sodium dodecylnaphthalene sulfate, dialkyl benzenealkyl, sulfates, sulfonates, adipic acid, hexa decyldiphenyloxide disulfonate, and mixtures thereof.

11. The coating solution of claim 1, wherein the surfactant is present in the coating solution in an amount of from about 0.0001 percent to about 10 percent by weight of the total weight of the coating solution.

12. The coating solution of claim 1, wherein the solvent is selected from the group consisting of deionized water, methanol, methyl ethyl ketone, ethanol, propanol, tetrahydrofuran, acetone, dimethylformamide, N-methylpyrrolidinone, and mixtures thereof.

13. The coating solution of claim 1, wherein the solvent is present in the coating solution in an amount of from about 10 percent to about 99.9 percent by weight of the total weight of the coating solution.

14. An imaging member comprising:
   a substrate;
   a charge blocking layer disposed on the substrate;
   an interfacial layer disposed on the charge blocking layer; and
   a charge imaging layer, wherein the adhesive interfacial layer is disposed between the charge blocking layer and the charge imaging layer, and further wherein the interfacial layer is crosslinked and formed from an aqueous-based coating solution comprising a charge control agent, a surfactant, and a solvent.

15. The imaging member of claim 14, wherein the aqueous-based coating solution further comprises a polyester resin.

16. The imaging member of claim 14, wherein the interfacial layer has a thickness of from about 0.01 to about 5 micrometers.

17. A coating solution for forming an interfacial layer, comprising:
   a charge control agent;
   a surfactant;
   a polyester resin; and
   a solvent, wherein the coating solution is aqueous-based and the polyester resin is a copolymer of terephthalic acid, dodecenylsuccinic anhydride, trimellitic acid, fumaric acid, Bisphenol A ethylenoxide adducts, and Bisphenol A propylenoxide adducts.

18. A coating solution for forming an interfacial layer, comprising:
   a charge control agent;
   a surfactant; and
   a solvent, wherein the coating solution is aqueous-based and the charge control aqent is selected from the group consisting of zinc salicylate, calcium salicylate, aluminum salicylate, chromium salicylate, boron salicylate, zirconium salicylate, iron salicylate, and mixtures thereof.

* * * * *